United States Patent [19]

Abe et al.

[11] Patent Number: 5,183,141

[45] Date of Patent: Feb. 2, 1993

[54] RELEASE MECHANISM FOR PULL-TYPE CLUTCH

[75] Inventors: Minoru Abe; Tetsuji Takano, both of Neyagawa, Japan

[73] Assignee: Kabushiki Kaisha Daikin Seisakusho, Neyagawa, Japan

[21] Appl. No.: 807,830

[22] PCT Filed: May 9, 1991

[86] PCT No.: PCT/JP91/00619

§ 371 Date: Jan. 22, 1992

§ 102(e) Date: Jan. 22, 1992

[87] PCT Pub. No.: WO91/18222

PCT Pub. Date: Nov. 28, 1991

[30] Foreign Application Priority Data

May 24, 1990 [JP] Japan .................. 2-134756

[51] Int. Cl.[5] .................... F16D 23/14; F16D 25/08
[52] U.S. Cl. .................... 192/91 A; 192/98; 192/DIG. 1; 192/85 CA
[58] Field of Search ............ 192/70.13, 85 CA, 91 A, 192/98, 110 B, DIG. 1

[56] References Cited

U.S. PATENT DOCUMENTS

| | | | |
|---|---|---|---|
| 4,344,516 | 8/1982 | Kolb | 192/85 CA |
| 4,399,898 | 8/1983 | Olschewski et al. | 192/98 |
| 4,456,111 | 6/1984 | Limbacher | 192/85 CA |
| 4,502,583 | 3/1985 | Limbacher | 192/98 |
| 4,648,499 | 3/1987 | Despres et al. | 192/98 |
| 4,687,084 | 8/1987 | Leigh-Morstevens et al. | 192/85 CA |
| 4,691,814 | 9/1987 | Wimbush | 192/91 A |
| 4,778,039 | 10/1988 | Eliasson | 192/85 CA |

FOREIGN PATENT DOCUMENTS

| | | |
|---|---|---|
| 56-73228 | 6/1981 | Japan . |
| 60-41618 | 3/1985 | Japan . |
| 2098697 | 11/1982 | United Kingdom ............ 192/91 A |

Primary Examiner—Richard Lorence
Attorney, Agent, or Firm—Armstrong, Westerman, Hattori, McLeland & Naughton

[57] ABSTRACT

A release mechanism for a pull-type clutch which is disengaged by pulling an inner peripheral part of a diaphragm spring (6) to an axial backside of the clutch. A release bearing assembly (10) is connected to the inner peripheral part of the diaphragm spring (6). A cylinder assembly (11) is mounted to a housing (12) of the clutch at an axial backside of the release bearing assembly (10). The release bearing assembly (10) is connected to the cylinder assembly (11) through means of a connecting ring (60) and a stopper (70).

4 Claims, 2 Drawing Sheets

RELEASE MECHANISM FOR PULL-TYPE CLUTCH

TECHNICAL FIELD

This invention relates to a friction clutch of a pull-type clutch for use in an automobile etc., and particularly to a mechanism especially suitable for a release mechanism designed to move a release bearing by actuating a hydraulic cylinder disposed in a clutch housing.

BACKGROUND ART

The release mechanism of this type is described in U.S. Pat. No. 4,687,084, for example. In the mechanism described therein, a release bearing assembly, connected to a diaphragm spring, and a hydraulic cylinder assembly, secured to a clutch housing, are assembled as separate elements and are connected together at the final stage of assembly work.

For the purpose of connecting the separate elements, plural claws are formed on both the release bearing assembly and the cylinder assembly with spaces left between the claws in circumferential direction. The claws of cylinder assembly are placed between the claws of release bearing assembly, and the claws are then connected, in axial direction, by a ring engaging with grooves provided on the outer peripheries of the claws. In this mechanism, the connecting ring is previously engaged with the grooves of the claws of the release bearing assembly in the assembly work. At the final stage of assembly work, when the entire cylinder assembly is moved forward from a backside position of the release bearing assembly, the claws of cylinder assembly temporarily expand and pass through the connecting ring. At the moment the claws reach a specified position, the connecting ring engages the grooves of both claws. Thus, the assembly work is carried out comparatively easily.

However, the above mechanism is not designed to disconnect one-side claws from the other-side claws, easily, when the clutch is to be disassembled. Consequently, it is hard to disconnect the release bearing assembly from the cylinder assembly.

The present invention provides a mechanism for overcoming the above-mentioned problem.

DISCLOSURE OF THE INVENTION

In the present invention, a pull-type clutch is disengaged by pulling an inner peripheral part of a diaphragm spring to an axial backside of the clutch. A release mechanism, including a release bearing assembly, for the pull-type clutch, is connected to the inner peripheral part of the diaphragm spring. A cylinder assembly is mounted to a housing of the clutch at an axial backside of the release bearing assembly. Plural first claws, extending backward in an axial direction, are formed on the release bearing assembly. Plural second claws, extending forward in the axial direction, are integrally formed on a piston of the cylinder assembly. The first and second claws are disposed with clearances left between them in a circumferential direction, respectively, so as to permit the second claw to get in between the adjacent two first claws in the circumferential direction of clutch. A connecting ring, extending in the circumferential direction and expandable in radial directions, is installed on outer peripheries of the second claws in such a manner as to be immovable in the axial direction of the clutch. Connecting grooves, in which the connecting ring fits immovably in the axial direction, are formed on outer peripheries of the first claws. Guide portions are formed on rear end outer peripheries of the first claws. The guide portions are engagable with an inner periphery of the connecting ring and expand the ring when the connecting ring moves forward relative to the rear end from its backward position. A ring stopper, movable between a front releasing position and a rear engaging position, together with a stopper spring for urging the stopper backward, are installed in the release bearing assembly. The ring stopper fits onto an outer periphery of the connecting ring fitting in the connecting grooves at the engaging position. Tool supports, facing each other with an axial tool insertion clearance therebetween are provided on the ring stopper and the cylinder assembly.

According to the above-mentioned structure, in the assembly work, the entire cylinder assembly is moved forward from the backside position of the release bearing assembly when the connecting ring is fit onto the second claws of the cylinder assembly. The connecting ring is then temporarily expanded by the first claws. When the claws reach clearances between the adjacent claws, the connecting ring shrinks elastically to fit in the connecting grooves so that the claws are connected to each other relatively immovably in the axial direction.

When the connection is completed, the ring stopper is urged, by the stopper spring, to the engaging position, so that the ring stopper prevents the connecting ring from expanding outwardly, in radial directions, i.e. getting out of the connecting grooves.

When the cylinder assembly is to be disconnected from the release bearing assembly, a proper tool is inserted between the tool supports provided on the ring stopper and the cylinder assembly so as to push the ring stopper to the releasing position. The connecting ring is thereby brought into the expandable state, so that the connecting ring, held by the second claws, is expanded from the connecting grooves of the first claws by moving the second claws backward. Thus, the cylinder assembly is disconnected from the release bearing assembly to the backside.

BEST MODE FOR CARRYING OUT THE INVENTION

Figure 1:
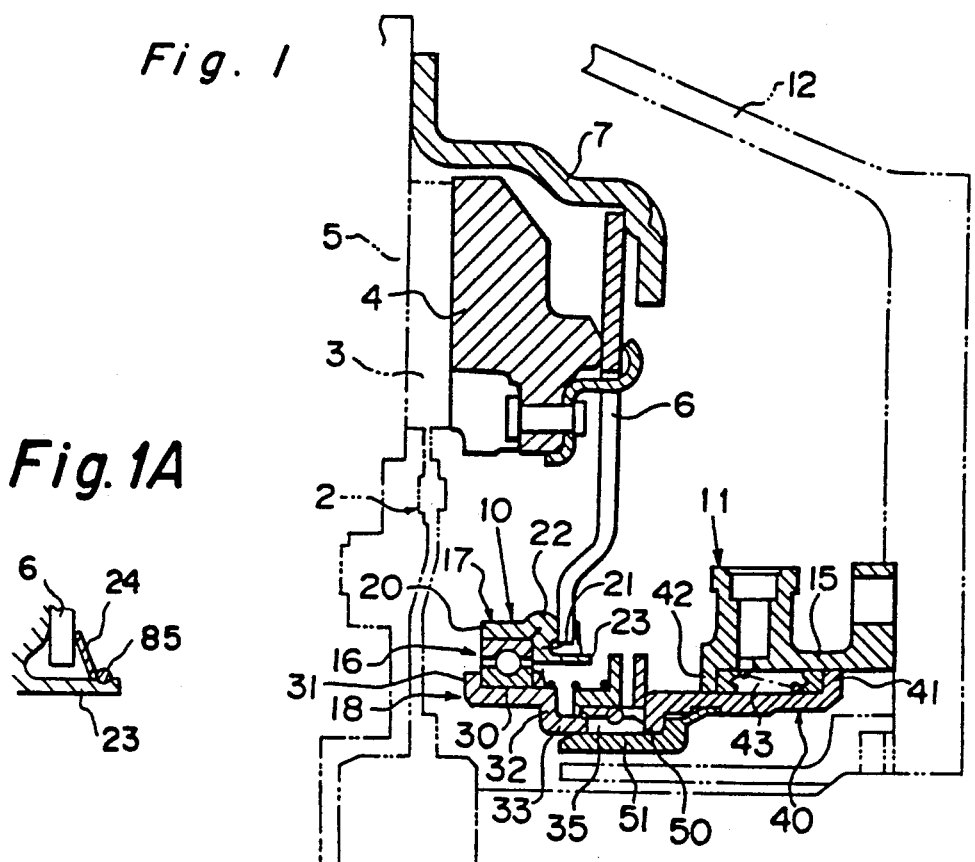
FIG. 1 is a schematic sectional view of an embodiment of the present invention.

In FIG. 1, facing 3, located at an outer periphery of clutch disc 2, is coupled to clutch output shaft 1 and is pressed onto flywheel 5 by pressure plate 4. Diaphragm spring 6 is disposed at a rear side of pressure plate 4. Clutch cover 7, supporting an outer peripheral end of diaphragm spring 6, is secured to an outer peripheral part of flywheel 5. Diaphragm spring 6 is connected, at its radial intermediate portion, to a backside projection of pressure plate 4. An inner peripheral part of diaphragm spring 6 is connected to release bearing assembly 10, and bearing assembly 10 is connected to cylinder assembly 11, disposed at a backside of bearing assembly 10 in clutch axial direction (direction in arrow A, FIG. 1).

In a clutch disengaging operation, cylinder assembly 11 pulls bearing assembly 10 backward in the clutch axial direction as shown by the arrow A. The inner peripheral part of diaphragm spring 6 is thereby pulled in the same direction so that pressure plate 4 is separated from facing 3, and the clutch is disengaged. The above-mentioned structure and fundamental operation are well known.

The foregoing components are incorporated in clutch housing 12. Cylinder assembly 11 is secured to clutch housing 12 at a rear end of cylindrical external cylinder 15. In the present invention, improvement is made in bearing assembly 10 and cylinder assembly 11 as will be described below.

Bearing assembly 10 has bearing 16, with external case 17 fits onto its outer periphery and connected to diaphragm spring 6. Internal case 18 is secured to an inner periphery of bearing 16.

Figure 1A:
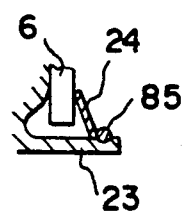
FIG. 1A is an enlarged view of the inner end of the diaphragm, the cylindrical portion of the outer bearing case and associated elements.

External case 17, having cylindrical portion 20, fits onto an outer periphery of an outer race of bearing 16. Flanged portion 21, contacting with a rear end face of the outer race, has a curved portion 22, integrally extending between the flanged portion and rear end face and projects radially outwardly and backwardly. Cylindrical portion 23 projects backwardly from an inner periphery of portion 21. Snap ring 85, disposed at a rear end outer periphery of portion 23, is clamped by an inner peripheral part of coned disc spring 24, FIG. 1A. The inner periphery of diaphragm spring 6 is located at a radial outside of the portion 23, with a clearance therebetween. The inner peripheral part of diaphragm spring 6 is between a rear end face of portion 22 and an outer peripheral part of coned disc spring 24.

Internal case 18 has cylindrical portion 30 extending along an inner peripheral surface of an inner race of bearing 16. Flange-shaped portion 31, extends radially outwardly from a front end of portion 30. Flange-shaped portion 32 extends radially inwardly from a rear and of portion 30. Cylindrical portion 33 extends backwardly from an inner peripheral part of portion 32. Plural claws 35 extend backwardly from portion 33.

Portion 31 engages with a front end face of an inner race of bearing 16. Spring retainer 36 is installed on a rear end outer periphery of the portion 30 with wave spring 37 disposed between spring retainer 36 and bearing 16. Portion 30 faces on an inner periphery of bearing 16 with a slight clearance left therebetween.

Bearing 16, external case 17 and internal case 18 are constructed, as described above, so that they move, relatively, in the radial direction and so that an accurate coaxial relating between them can be kept when operation is commenced, even if they deviate in the radial direction relative to the diaphragm spring 6 before commencing the operation.

Cylindrical piston 40 is installed at a radial inside of cylinder 15. Piston 40 has an outward flange-shaped end wall 41 at a rear end of the piston 40. End wall 41, slidingly contacts an inner peripheral surface of cylinder 15. Cylinder 15 has an inward flange-shaped end wall 42 at its front end. The inner periphery of end wall 42 slidingly contacts an outer periphery of the cylindrical body of piston 40. An operation chamber 43 is thereby formed between cylinder 15 and the body of piston 40. Seals 45 are disposed at axial opposite ends of operation chamber 43. Compression coil spring 46 is installed between both seals 45. Boss 47, extending radially outwardly, is positioned at a front of cylinder 15, and passage 48, interconnecting the operation chamber 43 to an outside passage 86, is provided in boss 47. This outside passage 86 extends to outside of clutch housing 12 for connection to hydraulic control mechanism 87.

An inward flange 50 is integrally formed on a front end of piston 40. Cylindrical member 51 fits in an inner periphery of flange 50. The cylindrical member 51 extends beyond a front side of flange 50 so as to fit in inner peripheries of the portion 33 and freely slide in claws 35. A rear end of cylindrical member 51 is extended radially outwardly, and is secured to an inner periphery of the cylindrical body of piston 40.

Figure 2:
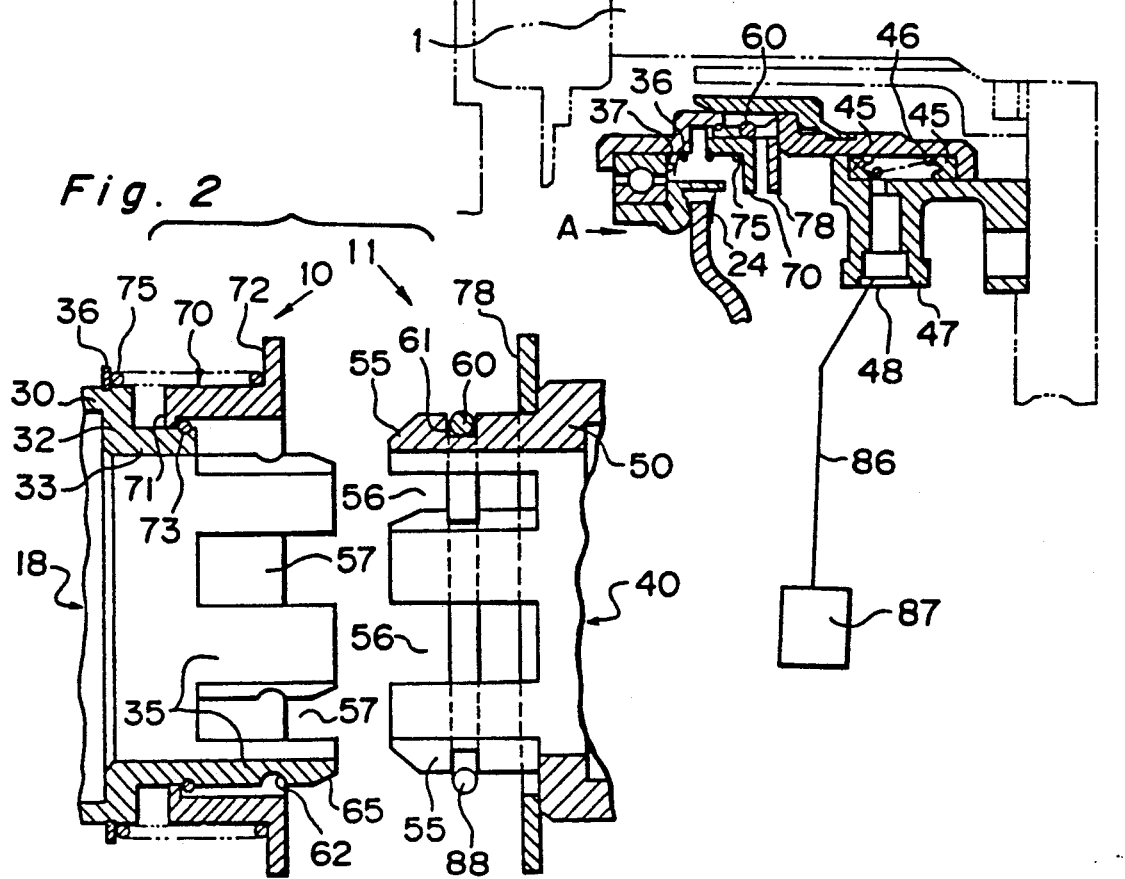
FIG. 2 is an enlarged partial sectional schematic view under disassembled state.

FIG. 2 is the enlarged schematic partial sectional views of bearing assembly 10 and cylinder assembly 11 under disassembled states. As seen from these figures, plural claws 55 extend forward from an inner peripheral part of flange 50 of the piston 40 and these are arranged on line in circumferential direction with equal distances between the claws. Further, claws 35 of internal case 18 are arranged on line in circumferential direction with equal distances left between claws. To be more concrete, one claw 35 can be inserted in a clearance 56 existing between two adjacent claws 55. Conversely, one claw 55 can be inserted in a clearance 57 existing between two adjacent claws 35.

Under the state of combining claws 35 and 55 in such manner, the assemblies are connected by a connecting ring 60 immovably in the axial direction. Connecting ring 60 extends along outer peripheral surfaces of the claws 55 (and the claws 35 under assembled state), and has a gap 88, in order, to allow elastic deformation of ring 60 in radial direction. Holding grooves 61, into which connecting ring 60 is seated are formed on outer peripheral surfaces of claws 55, and connecting grooves 62 in which the connecting ring 60 fits are formed on outer peripheral surfaces of claws 35.

Holding groove 61 is deep, and its depth is approximately as large as a diameter of ring 60. A section of holding groove 61 is rectangular, and its both side faces are formed by flat surfaces extending in the radial direction. By constructing holding grooves 61 in this way, connecting ring 60 can be deformed inside grooves 61 in the radial direction but can not be moved substantially in the axial direction, in an assembly work and a disassembly work described later.

The other connecting groove 62 are formed into comparatively shallow grooves having arcuate sectional shapes. Therefore, when ring 60 fits in connecting groove 62, ring 60 can not be moved relative to connecting grooves 62 in the axial direction under this state. But, if connecting ring 60 is forcedly pushed backward (direction A), ring 60 is guided by curved bottom surfaces of grooves 62 to be opened so that connecting ring 60 can be released from groove 62 comparatively easily.

An inclining surface (guide 65), inclining backwardly and radially inwardly, is formed on a tip end outer peripheral surface of each claw 35 A cylindrical stopper 70 is formed on a radial outside of claw 35. Stopper 70 has a cylindrical body extending in the clutch axial direction, an inward flange 71 extending from a front end of the body to a radial inside, and an outward flange 72 extending from its rear end to a radial outside all formed integrally. Inward flange 71 contacts, freely slidingly at its inner periphery, with an outer periphery of portion 33. A ring-shaped snap ring 73 is fixed to a rear end outer periphery of portion 33, and inward flange 71 is thereby prevented from moving backward beyond an engaging position (described later) of FIG. 2. A compression coil spring 75 is installed at an outside of cylindrical body of stopper 70 and between outward flange 72 and spring retainer 36.

According to this structure, when connecting ring 60 is fit onto holding groove 61 and entire piston 40 is moved from a rear side to a front side of case 18, the both assemblies can be connected together as illustrated in the figure. That is, when claws 35 and claws 55 are brought into clearances 56 and 57, respectively, by moving the piston forward, guide 65 is first engaged with the inner periphery of connecting ring 60. By further advancing the piston, guide 65 expands ring 60 which, in turn, rides on an outer peripheral surface portion between guide 65 of claw 35 and connecting groove 62, as seen from FIG. 3. When both claws 35 and 55 reach respective specified positions, by still further advancing the piston, connecting ring 60 shrinks to get in connecting groove 62 so that the both come into connection each other relatively immovably in the axial direction.

In the midway of the above connecting operation, when expanded ring 60 contacts with the inner periphery of outward flange 72, to move entire stopper 70 to a front side evacuation position, and connecting ring 60 fits in connecting groove 62, stopper 70 is returned to the engaging position of FIG. 1 by a function of spring 75. At this engaging position, an inner peripheral surface of stopper 70 engage with, or come close to, an outer periphery of connecting ring 60 to prevent connecting ring 60 from expanding, so that connecting ring 60 is prevented from getting out of connecting groove 62. As described above, case 18 can be connected to piston 40 easily, and the both are connected according to the procedure described below in the practical clutch assembly work.

In FIG. 1, case 18 is previously assembled as a part of bearing assembly 10. The entire bearing assembly 10 is assembled to diaphragm spring 6, and diaphragm spring 6 is, in turn, assembled together with clutch cover 7 and pressure plate 4 to flywheel 5. On the other hand, piston 40 is assembled as a part of cylinder assembly 11 at a separate place, as shown by FIG. 1. After these assembly works, cylinder assembly 11 is assembled to bearing assembly 10, together with clutch housing 12 from its rear side up to the illustrated position. Then, piston 40 is, thereby, automatically connected to case 18, as described above.

In this way, cylinder 15, to which piston 40 is assembled, is pushed forward to advance piston 40 to the case 18 side in the practical assembly work. In consideration of this procedure, block 76, shown in FIG. 3, is temporarily attached to piston 40.

Figure 3:
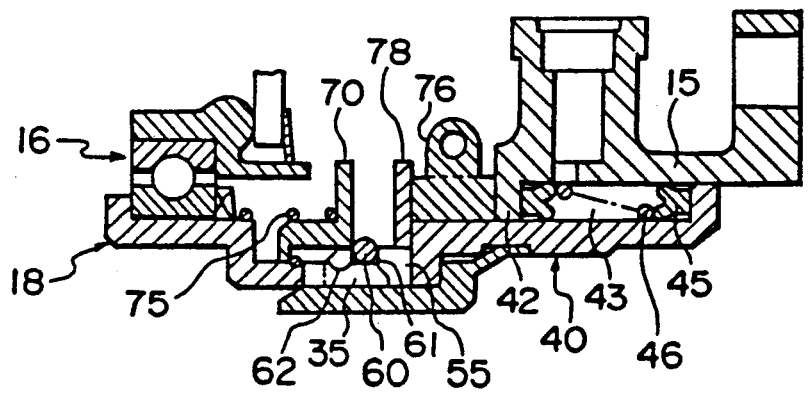
FIG. 3 is a schematic sectional view showing a midway stage of connecting work.

In FIG. 3, an annular or flange-shaped support member 78 is installed around a base end portion (rear end portion) of claw 55. Support member 78 contacts with a front end surface of the cylindrical body of piston 40 and is secured to piston 40 by an appropriate means. Support member 78 extends radially outwardly, beyond the cylindrical body of piston 40, and block 76 is disposed between support member 78 and the cylinder end wall 42 in the assembly work.

Figure 4:
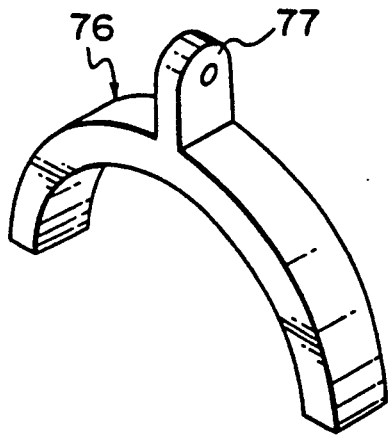
FIG. 4 is a perspective view of a block of FIG. 3.

As illustrated by the oblique view of FIG. 4, block 76 is an arcuate member, and a projection 77, having a tool insertion hole, extends radially outwardly from its longitudinal intermediate portion. In FIG. 3, block 76 covers a range less than a half of outer periphery of piston 40. Accordingly, block 76 can be attached to, and detached from, piston 40 in the radial direction so that it is removed after completion of the foregoing assembly work.

By using the above block 76 in the foregoing assembly work, when cylinder 15 is pushed forward, piston 40 is prevented from moving backward (from not moving forward) relative to cylinder 15 by compressing spring 46.

The disassembly work of piston 40, from case 18, and a mechanism therefor, will be described hereunder.

Figure 5:
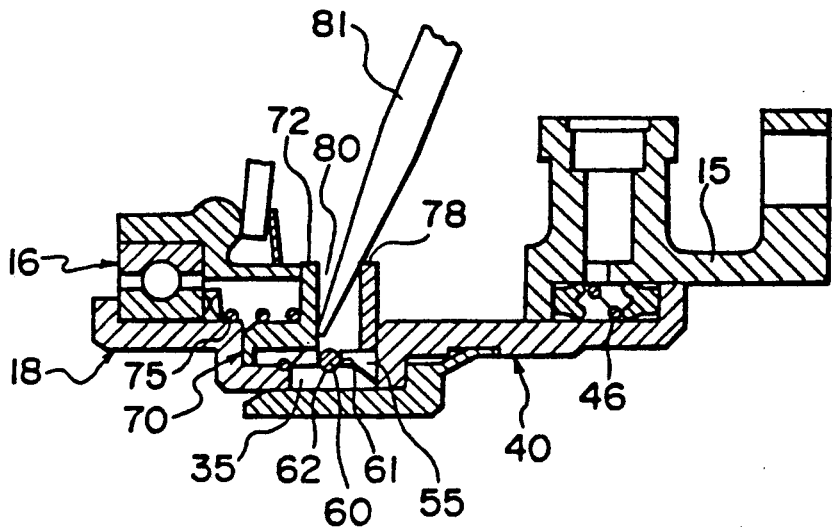
FIG. 5 is a schematic sectional view showing a midway stage at disassembly.

As shown by FIG. 5, clearance 80 is provided between support member 78 and outward flange 72 (support member). A bar-shaped tool 81 is inserted in clearance 80, and stopper 70 is forcedly moved forward, up to a disengaging position shown by FIG. 5. In this way, connecting ring 60 is brought into a freely expandable state. By pulling piston 40 backward in this state, connecting ring 60 is disengaged from connecting grooves 62, while being held in the grooves 61 of the claws 55. Thus, it becomes possible to pull piston 40 backward from case 18.

Further, return spring 46 is active to move piston 40 backward and functions as follows.

The operation chamber 43 is not pressurized at the time of the disassembly work. On the other hand, piston 40 is moved by an elastic force of diaphragm spring 6 (FIG. 1) to its foremost position, because piston 40 is connected to case 18, so that spring 46 is compressed considerably. However, when stopper 70 is released by tool 81, as described above, an elastic force of return spring 46 is active to move piston 40 in the backward direction and connecting ring 60 can thereby be released from groove 62.

According to the present invention, as described above, the improvement is made on the connecting mechanism between bearing assembly 10 and cylinder assembly 11, so that not only the both can be connected simply but also the both can be separated, easily, by utilizing simple tool 81. Consequently, the release mechanism for clutch having excellent abilities in maintenance and inspection becomes obtainable.

What is claimed is:

1. In a pull-type clutch disengaged by pulling an inner peripheral part of a diaphragm spring to an axial backside of the clutch; a release mechanism for said pull-type clutch having a release bearing assembly connected to an inner peripheral part of said diaphragm spring, a cylinder assembly mounted to a housing of said clutch at an axial backside of said release bearing assembly, plural first claws, extending backward in an axial direction of said clutch and formed on said release bearing assembly, plural second claws extending forward in an axial direction of said clutch and integrally formed on a piston of said cylinder assembly, said first and second claws being disposed with clearance left between said first claws and said second claws, respectively, in a circumferential direction, said piston being axially movable relative to said release bearing assembly from a first position where said first claws are axially spaced apart from said second claws to a second position where said second claws are positioned circumferentially between said first claws, a connecting ring extending in said circumferential direction and expandable in radial directions positioned on outer peripheries of said second claws and immovable in said axial direction of said clutch relative to said second claws, connecting grooves on an outer periphery of said first claws into which said connecting ring fits when said piston is in said second position, guide portions formed on rear outer peripheries of said first claws, said guide portions being engageable with an inner periphery of said connecting ring to expand said ring when said piston moves from said first position to said second position, a ring stopper movable between a front releasing position and a rear engaging position, together wtih a stopper spring on said release bearing assembly for urging said stopper backward, said ring stopper, fitting onto an outer periphery of said connecting ring, when said piston is in said second position and said ring stopper is at said engaging position, and tool supports facing each other, with an axial tool insertion clearance therebetween on said ring stopper and said cylinder assembly.

2. A release mechanism for a pull-type clutch as set forth in claim 1, in which said connecting ring has a circular wire element section, including a gap, and elastically fits in holding grooves having substantially square sections formed on outer peripheries of said second claws, said holding grooves having a depth substantially equal to a diameter of said wire element of said connecting ring, said connecting grooves formed on the outer periphery of said first claws being formed into semi/circular shape having a depth smaller than the diameter of said wire element of said connecting ring, and the guide portions, provided at the outer peripheral rear ends of said first claws, are formed into a tapered shape shrinking toward the backside so that, when said second claws are advanced relative to said first claws, said guide portions contact with said inner peripheral part of said connecting ring so as to open said connecting ring.

3. A release mechanism for a pull-type clutch as set forth in claim 1, in which said ring stopper has a cylindrical body and an outer flange serving also as one-side tool support at a rear end of said cylindrical body, an inward flange provided at its front end fits onto a cylindrical portion of an internal case of said bearing assembly, said stopper spring urging said ring stopper toward said rear engaging position where said inward flange contacts with a snap ring fitting onto said cylindrical portion and an inner peripheral surface of said stopper covers said holding grooves so as to prevent said connecting ring from getting out of said connecting grooves and said holding grooves.

4. A release mechanism for a pull-type clutch as set forth in claim 3, in which said piston has a cylindrical body fitted into an inward flange-shaped end wall at a front end of an external cylinder of said cylinder assembly, an outward flange-shaped end wall at a rear end of said piston fits into an inner peripheral surface of said body of said external cylinder, seals on opposite ends and a return spring disposed, compressively, between said both seals in an operation chamber formed between said end walls, said operation chamber being interconnected through a passage, and an outside passage to a hydraulic control mechanism, an annular support member serving as another tool support being secured to rear ends of said second claws and located at the front end of said piston, said tool insertion clearance being located between said outer flange of said ring stopper and said support member, and said stopper being movable against an elastic force of said stopper spring so as to withdraw said stopper forward beyond said holding groove.

* * * * *